(12) United States Patent
Herla

(10) Patent No.: US 7,063,173 B2
(45) Date of Patent: Jun. 20, 2006

(54) SPINDLE UNIT WITH SWITCHABLE GEAR, AND METHOD FOR USING THE SPINDLE UNIT

(75) Inventor: Max Herla, Röthlein (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/820,445

(22) Filed: Apr. 8, 2004

(65) Prior Publication Data

US 2004/0226730 A1   Nov. 18, 2004

(30) Foreign Application Priority Data

Apr. 9, 2003   (DE) ................................ 103 16 245

(51) Int. Cl.
*B23B 19/02*   (2006.01)

(52) U.S. Cl. .................... 173/216; 173/29; 173/48; 173/178; 173/213; 475/298

(58) Field of Classification Search ............... 173/48, 173/216, 213, 178, 104, 47, 29; 475/265, 475/290, 317, 320, 298, 299; 409/231; 408/124, 408/238

See application file for complete search history.

(56) References Cited

U.S. PATENT DOCUMENTS

| | | | | |
|---|---|---|---|---|
| 5,006,100 A | * | 4/1991 | Brandt et al. ............... | 475/138 |
| 5,011,341 A | * | 4/1991 | DeGroff ...................... | 408/124 |
| 5,339,908 A | * | 8/1994 | Yokota et al. ............... | 173/216 |
| 5,449,043 A | * | 9/1995 | Bourner et al. ............. | 173/178 |
| 5,531,278 A | * | 7/1996 | Lin ............................. | 173/176 |
| 5,782,593 A | | 7/1998 | Klement | |
| 5,947,212 A | * | 9/1999 | Huang ......................... | 173/216 |
| 6,093,130 A | * | 7/2000 | Buck et al. .................. | 475/298 |
| 6,438,813 B1 | * | 8/2002 | Bernhard ....................... | 29/39 |
| 6,595,893 B1 | * | 7/2003 | Takayama et al. ........... | 475/298 |
| 6,655,470 B1 | * | 12/2003 | Chen ............................ | 173/47 |

FOREIGN PATENT DOCUMENTS

| | | |
|---|---|---|
| DE | 36 29 453 A1 | 3/1988 |
| DE | 42 01 849 A | 12/1992 |
| DE | 196 11 459 A1 | 9/1997 |
| DE | 199 37 447 | 2/2001 |

* cited by examiner

*Primary Examiner*—Scott A. Smith
(74) *Attorney, Agent, or Firm*—Henry M. Feiereisen

(57) ABSTRACT

A system and a method are described that facilitate gear switching of a motor-driven spindle. A spindle head shaft is driven by a drive shaft via a gear mechanism in a first gear position. The drive shaft, including a rotor, can be switched from the first gear position to a second gear position where the spindle head shaft is connected by interference fit directly with the drive shaft without the interposed gear mechanism. The spindle head shaft can then be directly driven by the drive shaft in the second gear position. This eliminates the need to dismantle an anterior spindle from the drive unit.

10 Claims, 3 Drawing Sheets

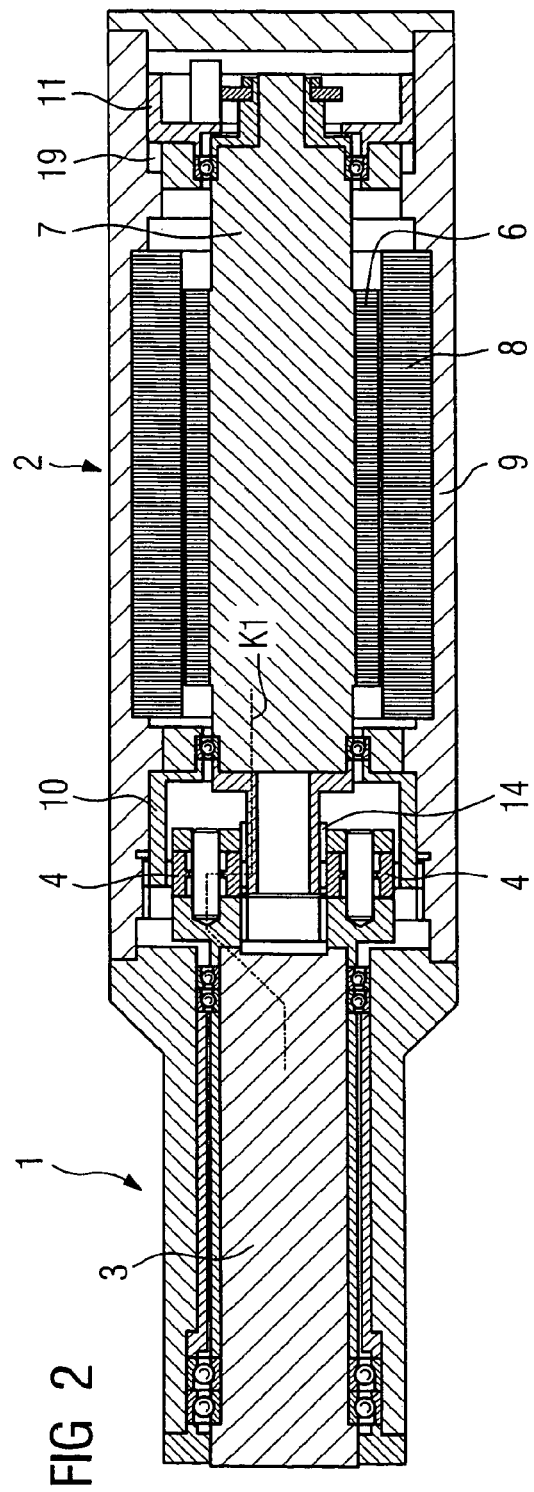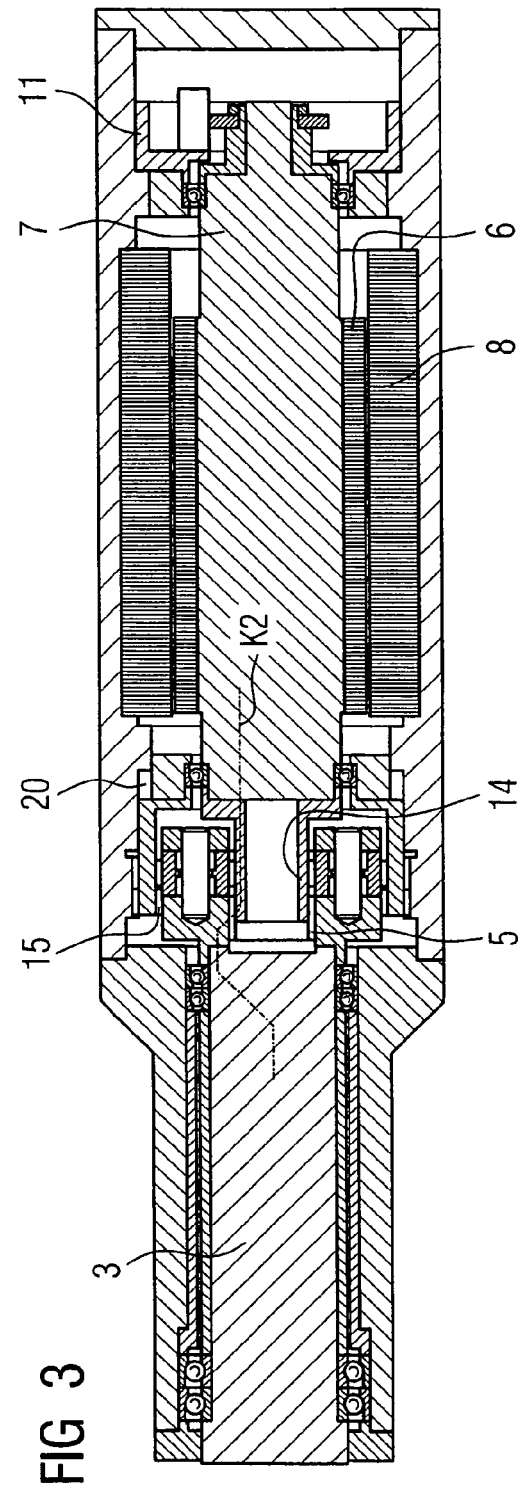

SPINDLE UNIT WITH SWITCHABLE GEAR, AND METHOD FOR USING THE SPINDLE UNIT

CROSS-REFERENCES TO RELATED APPLICATIONS

This application claims the priority of German Patent Application, Serial No. 103 16 245.3, filed Apr. 9, 2003, pursuant to 35 U.S.C. 119(a)–(d), the disclosure of which is incorporated herein by reference.

BACKGROUND OF THE INVENTION

The present invention relates to a spindle unit for machine tools that facilitates switching of the rotation speed of the spindle unit. The present invention also relates to a method for operating a spindle unit of this type.

Spindle units are employed, for example, in motor-driven milling machines. A motor-driven milling spindle can be made as a single-piece or of separable components and typically includes an electric motor with a shrink-fit rotor. The rotor is supported between two bearings blocks. A tool tensioning system that typically includes a chucking head, a tie rod and a disk spring arrangement is arranged in the interior of the shaft. A tensioning system sensor located on the tie rod and a tool loosening rod are typically also attached at the end of the spindle unit.

In particular applications of a motor-driven spindle, a greater torque may be necessary than can be supplied by the electric motor. For this purpose, a dual-stage planetary drive is typically connected between the electric motor and the spindle head. Advantageously, the drive unit can be decoupled from the spindle head or the anterior milling spindle. Advantageously, the gear can be used if required, or may not be used. However, it would be undesirable to require removal of the anterior spindle from the drive unit for increasing the rotation speed or torque of the spindle. In particular, since the tie rod for the tool chucking system on the side of the drive unit facing away from the tool would then also have to be removed. A motor-driven milling spindle of this type is known in the art.

A commonly used rotatable hollow processing spindle formed as one piece and supported in a housing is described in the German patent publication DE 199 37 447. A tie rod is arranged in the processing spindle for clamping and/or loosening a tool chuck. The tie rod can rotate and axially move with the processing spindle. The rotor of the driving electric motor is mounted on the hollow processing spindle.

It would therefore be desirable and advantageous to provide an improved spindle device for machine tools and a corresponding method for operating a spindle device, which obviates prior art shortcomings and facilitates adjustment of the torque and/or or the rotation speed of the spindle.

SUMMARY OF THE INVENTION

According to one aspect of the present invention, a spindle unit for a machine tool includes a drive unit having a drive shaft, a spindle head assembly constructed to receive a tool and having a hollow spindle head shaft which is driven by the drive unit, a gear mechanism arranged between the drive unit and the spindle head assembly, and a shifting unit for axially moving the drive shaft in such a way that in a first position the drive shaft is connected by interference fit with the spindle head assembly through intervention of the gear mechanism, and in a second position is directly connected by interference fit with the spindle head assembly.

According to another aspect of the invention, a method for operating a spindle unit for machine tools includes the steps of operating a drive shaft in a first position for driving a spindle head shaft through intervention of a gear mechanism, axially shifting the drive shaft to a second position in which the spindle head shaft is connected directly by interference fit, without intervention of the gear mechanism, and driving the spindle head shaft by the drive shaft in the second position.

In accordance with the present invention, the entire drive shaft can thus be moved without need for additional a mechanical switching mechanism. The provision of an axially displaceable support is sufficient.

According to another feature of the present invention, the gear mechanism can be constructed to include a planetary gear mechanism. In this way, torque transferred to the tool can be increased.

According to another feature of the present invention, the drive unit can include an electric motor with a rotor mounted, in particular shrink-fit, on the drive shaft. The electric motor can also include a stator that completely surrounds the rotor in both the first position and the second position of the drive shaft. With this approach, there is sufficient magnetic interaction with the stator even when the rotor is displaced with the drive shaft.

According to another feature of the present invention, the spindle head assembly can be constructed for removal from the drive unit. This allows different spindle heads and/or anterior spindles to be used with different tool chucks.

According to another feature of the present invention, the spindle unit can also include an axially displaceable bearing assembly that supports the drive shaft. In particular, the bearing assembly can include a bearing sleeve on each end of the drive shaft, supporting the drive shaft. This type of support in bearing sleeves required for thermal reasons can hence be maintained.

The shifting unit can be constructed to operate by using a hydraulic, pneumatic and/or electromechanical mechanism. In particular, a hydraulic shifting mechanism is advantageous because the bearing sleeves are normally already hydraulically pretensioned.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows a cross-sectional view of the motor-driven spindle of FIG. 1 in a first position of the gear mechanism;

FIG. 3 shows a cross-sectional view of the motor-driven spindle of FIG. 1 in a second position of the gear mechanism.

DETAILED DESCRIPTION OF PREFERRED EMBODIMENTS

Figure 1:
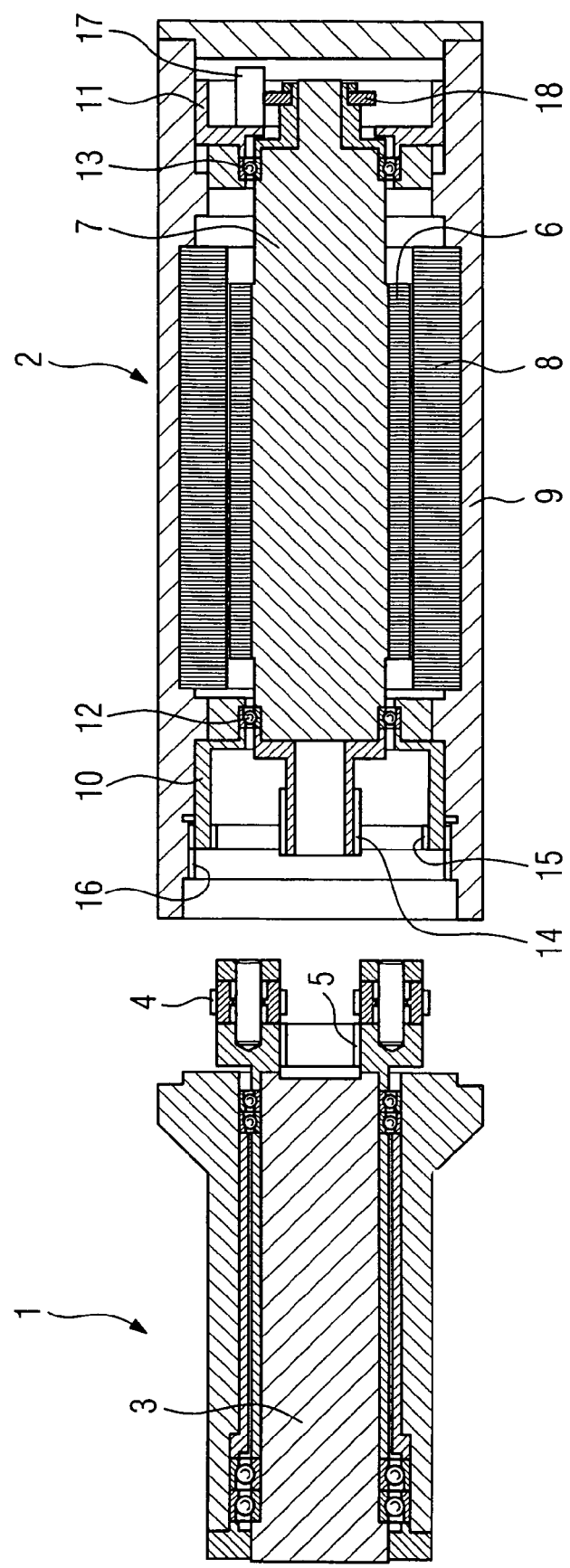
FIG. 1 shows a cross-sectional view of a segmented motor-driven spindle with a gear mechanism according to the present invention.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "SPINDLE FOR A MACHINE TOOL WITH IMPROVED TOOL EJECTION FEATURE", filed Apr. 8, 2004 and having application Ser. No. 10/820,441.

Turning now to the drawing, and in particular to FIG. 1, there is shown schematically a motor-driven milling spindle which includes a spindle head assembly and/or anterior spindle 1 and a drive unit 2. Both components are depicted separate from each other in the drawing. The anterior spindle 1 includes essentially a spindle head shaft 3 that is non-rotatably connected with the axles of planetary wheels 4 of a planetary drive. A hollow wheel 5 with the same tooth pattern as that of the planetary wheels 4 is located intermediate between the planetary wheels 4.

The drive unit 2 includes essentially an electric motor with a rotor 6 that is shrink-fit on a drive shaft 7. The stator 8 of the electric motor is mounted in a housing 9 of the drive unit 2. Bearing sleeves 10 and 11 which are movable in the axial direction are disposed in the housing 9. The drive shaft 7 is supported in the bearing sleeves 10 and 11 by bearings 12, 13. The bearing sleeves 10 and 11 can be moved in the axial direction by a hydraulic system (not shown).

The sun wheel 14 of the planetary gear is mounted on an end face of the drive shaft 7. The hollow wheel 15 of the planetary gear is connected with the bearing sleeves 10. The hollow wheel 15, which can be moved together with the drive shaft 7 and the bearing sleeve 10, respectively, is secured in the circumferential direction by an engaging tooth or spline pattern 16.

A rotary encoder 17 which is secured to the bearing sleeves 11 is located on the side of the drive shaft 7 facing away from the anterior spindle. The rotary encoder 17 senses an encoder wheel 18 that is mounted on the drive shaft 7 for determining the rotation speed and/or rotation position of the drive shaft 7. The rotary encoder 17 follows the movement of the bearing sleeve 11 and the drive shaft 7 in the axial direction.

Figure 4:
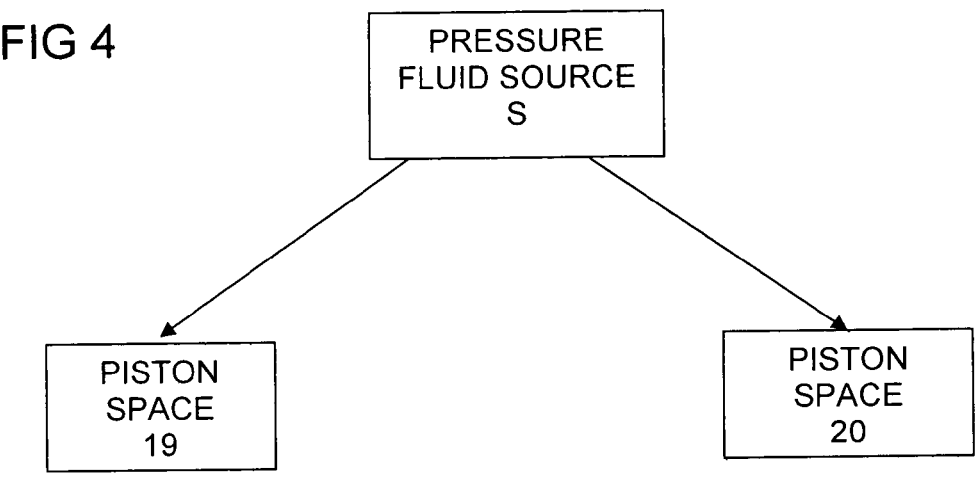
FIG. 4 is a block diagram showing interrelation between components of the motor-driven spindle.

FIG. 2 shows the anterior spindle 1 and the drive unit 2 in an assembled state. A piston space 19 of the hydraulic system is pressurized by pressure fluid from a hydraulic or pneumatic pressure fluid source S (FIG. 4). The bearing sleeve 11 together with the drive shaft 7 with the rotor 6 that is shrink-fit on the drive shaft 7 and the other bearing sleeve 10 then move inside the housing 9 of the drive unit 2 in FIG. 2 away from the anterior spindle 3, i.e., to the right in FIG. 2. The sun wheel 14 engages with the planetary wheels 4, so that a force is transmitted along the force path K1, shown as a dotted line in FIG. 2, from the drive shaft 7 via the sun wheel 14, the planetary wheels 4 to the spindle head shaft 3.

For sake of clarity, only components necessary to describe the indicated state are labeled in FIG. 2 with a reference character. The same applies to FIG. 3 described below.

FIG. 3 shows a pressurized piston space 20 wich is located on the other side of the electric motor and receiving pressure fluid from the pressure fluid source S. A portion of the bearing sleeve 10 facing the anterior spindle operates as a piston surface. The bearing sleeves 10 together with the drive shaft 7, including the rotor 6 and the bearing sleeve 11, then move toward the anterior spindle 1, i.e., to the left in FIG. 3. This shifting process causes the sun wheel 14 to non-positively engage with the hollow wheel 5 of the spindle head shaft 3. The hollow wheel 15 of the planetary gear, on the other hand, disengages from the planetary wheels 4. This removes the planetary gear from the force transmission, and the drive shaft 7 it is directly connected non-positively with the spindle head shaft 3. This is indicated in FIG. 3 by the force path K2 shown as a dotted line. The pressure fluid source S together with the piston spaces 19, 20 thus jointly form a shifting unit for axially moving the drive shaft 7. As an alternative, the shifting unit may be constructed by electromechanical means.

Even after the shift, the rotor 6 is still located below the stator 8, since the stator 8 has sufficient length. As also seen in FIG. 3, the rotary encoder 17 is shifted forward with the drive shaft 7 towards the anterior spindle, so that the rotation of the drive shaft 7 can be measured as before.

The stroke during the shifting operation depends on the gear characteristic, i.e., the width of the toothed gears. The hydraulic pressure required for moving and shifting the drive shaft is negligible compared to the pressure required for axially pretensioning the bearing sleeves, since only the switching forces have to be overcome. The size of the hydraulic system can therefore remain unchanged. Only two limit stops, which limit the displacement of the sleeves 10 and 11, have to be provided for the switching process. As a result, automatic switching of the motor-driven spindle drive does not require additional complex constructive measures.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A spindle unit for a machine tool, comprising:
   a drive unit having a drive shaft,
   a spindle head assembly constructed to receive a tool and having a hollow spindle head shaft which is driven by the drive unit, said spindle head assembly being constructed for removal from the drive unit;
   a gear mechanism arranged between the drive unit and the spindle head assembly, wherein the gear mechanism is constructed for at least partial connection to the spindle head assembly; and
   a shifting unit for axially moving the drive shaft in such a way that in a first position the drive shaft is forced into engagement with the spindle head assembly through intervention of the gear mechanism, and in a second position is forced into direct engagement with the spindle head assembly.

2. The spindle unit of claim 1, wherein the gear mechanism is constructed to include a planetary gear mechanism.

3. The spindle unit of claim 2, wherein the planetary gear mechanism includes planetary wheels non-rotatably connected to the spindle head shaft of the spindle head assembly, and a hollow wheel disposed between the planetary wheels.

4. The spindle unit of claim 3, wherein the planetary gear mechanism includes a sun wheel mounted to an end face of the drive shaft in confronting relationship to the spindle head shaft for engagement with the planetary wheels.

5. The spindle unit of claim 1, wherein the drive unit includes an electric motor having a rotor mounted on the drive shaft.

6. The spindle unit of claim 5, wherein the rotor is shrink-fitted on the drive shaft.

7. The spindle unit of claim 5, wherein the electric motor includes a stator which completely surrounds the rotor in the first and second positions of the drive shaft.

8. The spindle unit of claim 1, and further comprising an axially displaceable bearing assembly for support of the drive shaft.

9. The spindle unit of claim 8, wherein the drive shaft has opposite ends, said bearing assembly having a bearing sleeve for support of one end of the drive shaft, and another bearing sleeve for support of the other end of the drive shaft.

10. The spindle unit of claim 1, wherein the shifting unit is constructed for operation by one of hydraulic means, pneumatic means, and electromechanical means.

* * * * *